(12) United States Patent
Su et al.

(10) Patent No.: US 7,865,966 B2
(45) Date of Patent: Jan. 4, 2011

(54) METHOD AND APPARATUS OF AUTOMATIC SCANNING PROBE IMAGING

(75) Inventors: Chanmin Su, Ventura, CA (US); Sergey Belikov, Goleta, CA (US)

(73) Assignee: Veeco Metrology Inc., Santa Barbara, CA (US)

( * ) Notice: Subject to any disclaimer, the term of this patent is extended or adjusted under 35 U.S.C. 154(b) by 284 days.

(21) Appl. No.: 12/210,075

(22) Filed: Sep. 12, 2008

(65) Prior Publication Data

US 2009/0077697 A1    Mar. 19, 2009

Related U.S. Application Data

(60) Provisional application No. 60/971,828, filed on Sep. 12, 2007.

(51) Int. Cl.
G01Q 10/06 (2010.01)
G01Q 30/04 (2010.01)
G01Q 30/06 (2010.01)

(52) U.S. Cl. .............................. 850/4; 850/10; 850/11; 977/850

(58) Field of Classification Search .................. 850/4, 850/8, 10, 11; 977/850; 250/306, 307; 73/105
See application file for complete search history.

(56) References Cited

U.S. PATENT DOCUMENTS

| | | | |
|---|---|---|---|
| 5,260,572 A | 11/1993 | Marshall | |
| 6,005,246 A | 12/1999 | Kitamura et al. | |
| 6,028,305 A | 2/2000 | Minne et al. | |
| 6,121,771 A | 9/2000 | Moser | |
| 6,520,005 B2 * | 2/2003 | McWaid et al. | ............... 73/105 |
| 6,838,683 B1 | 1/2005 | Stevens et al. | |
| 7,391,022 B2 | 6/2008 | Ohta | |
| 7,770,439 B2 * | 8/2010 | Mininni | ....................... 73/105 |
| 2003/0089162 A1 * | 5/2003 | Samsavar et al. | ............. 73/105 |
| 2003/0197123 A1 | 10/2003 | Mitchell et al. | |
| 2006/0219899 A1 | 10/2006 | Ohta | |
| 2007/0023649 A1 * | 2/2007 | West | ......................... 250/307 |
| 2009/0262994 A1 * | 10/2009 | Haussecker et al. | ......... 382/128 |

FOREIGN PATENT DOCUMENTS

| | | |
|---|---|---|
| JP | 08-220110 | 8/1996 |
| JP | 2003-106976 | 4/2003 |
| JP | 2007-064812 | 3/2007 |
| KR | 10-2006-0075663 | 7/2006 |
| WO | 2007-076828 | 7/2007 |

* cited by examiner

*Primary Examiner*—Jack I Berman
(74) *Attorney, Agent, or Firm*—Boyle Fredrickson S.C.

(57) ABSTRACT

A method of operating a scanning probe microscope (SPM) includes scanning a sample as a probe of the SPM interacts with a sample, and collecting sample surface data in response to the scanning step. The method identifies a feature of the sample from the sample surface data and automatically performs a zoom-in scan of the feature based on the identifying step. The method operates to quickly identify and confirm the location of features of interest, such as nano-asperities, so as to facilitate performing a directed high resolution image of the feature.

31 Claims, 10 Drawing Sheets

514 ⌒ Trace segment
524 ⌒ Retrace segment
530 ⌒ Flipped retrace segment

METHOD AND APPARATUS OF AUTOMATIC SCANNING PROBE IMAGING

CROSS-REFERENCE TO RELATED APPLICATION

This application claims the benefit of U.S. Provisional Application No. 60/971,828, filed Sep. 12, 2007, incorporated herein by reference in its entirety.

BACKGROUND OF THE INVENTION

1. Field of the Invention

The preferred embodiments are directed to a method of imaging a sample using a scanning probe microscope (SPM), and more particularly, a method for automatically recognizing and verifying small-scale sample features, such as nano-asperities, with the SPM at high image resolution and scan rates.

2. Discussion of the Prior Art

A scanning probe microscope, such as an atomic force microscope (AFM) operates by providing relative scanning movement between a measuring probe and a sample while measuring one or more properties of the sample. A typical AFM system is shown schematically in FIG. 1. An AFM 10 employing a probe device 12 including a probe 14 having a cantilever 15 is shown. A scanner 24 generates relative motion between the probe 14 and a sample 22 while the probe-sample interaction is measured. In this way, images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner 24 may be an assembly of multiple separate actuators. Some AFMs separate the scanner into multiple components, for example an XY scanner that moves the sample and a separate Z-actuator that moves the probe.

Figure 1:
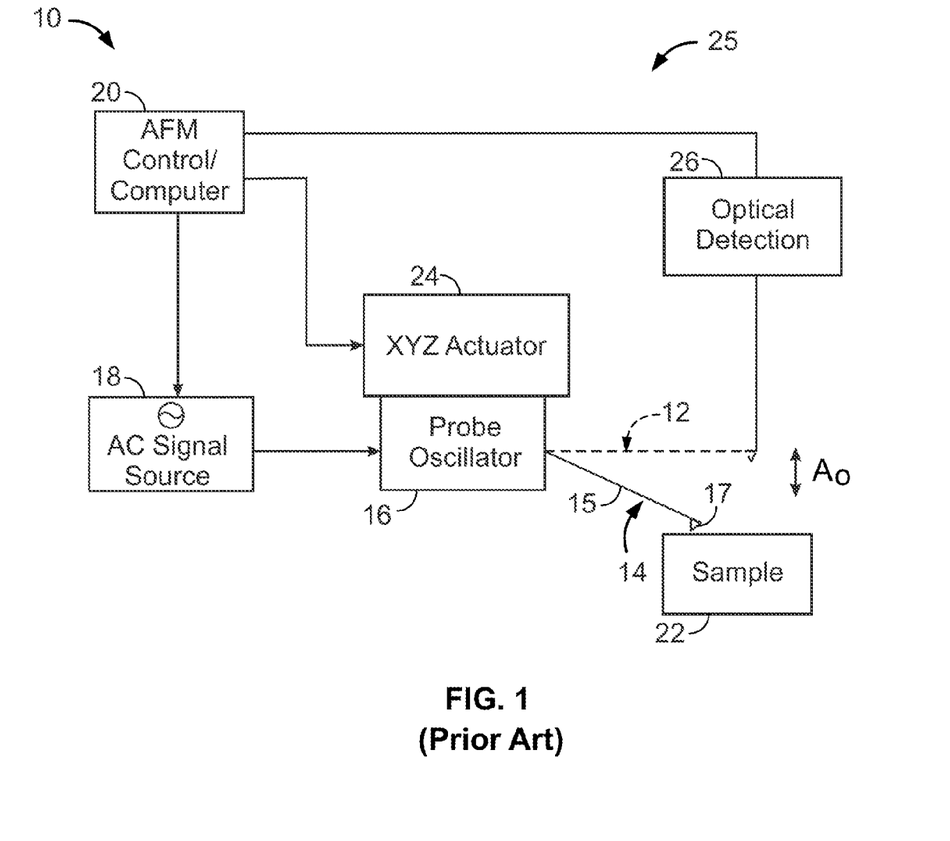
FIG. 1 is a schematic diagram of a prior art AFM, appropriately labeled "Prior Art"

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14 but may be formed integrally with the cantilever 15 of probe 14 as part of a self-actuated cantilever/probe.

Often a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26, such as a four quadrant photodetector. Note that the sensing light source of apparatus 25 is typically a laser, often a visible or infrared laser diode. The sensing light beam can also be generated by other light sources, for example a He—Ne or other laser source, a super-luminescent diode (SLD), an LED, an optical fiber, or any other light source that can be focused to a small spot. As the beam translates across detector 26, appropriate signals are transmitted to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. For example, controller 20 is often used to maintain the oscillation amplitude at a setpoint value, $A_S$, to insure a generally constant force between the tip and sample. Alternatively, a setpoint phase or frequency may be used.

A workstation is also provided, in the controller 20 and/or in a separate controller or system of connected or stand-alone controllers, that receives the collected data from the controller and manipulates the data obtained during scanning to perform point selection, curve fitting, and distance determining operations. The workstation can store the resulting information in memory, use it for additional calculations, and/or display it on a suitable monitor, and/or transmit it to another computer or device by wire or wirelessly. The memory may comprise any computer readable data storage medium, examples including but not limited to a computer RAM, hard disk, network storage, a flash drive, or a CD ROM. Notably, scanner 24 often comprises a piezoelectric stack (often referred to herein as a "piezo stack") or piezoelectric tube that is used to generate relative motion between the measuring probe and the sample surface. A piezo stack is a device that moves in one or more directions based on voltages applied to electrodes disposed on the stack. Piezo stacks are often used in combination with mechanical flexures that serve to guide, constrain, and/or amplify the motion of the piezo stacks. Additionally, flexures are used to increase the stiffness of actuator in one or more axis, as described in copending application Ser. No. 11/687,304, filed Mar. 16, 2007, entitled "Fast-Scanning SPM Scanner and Method of Operating Same." Actuators may be coupled to the probe, the sample, or both. Most typically, an actuator assembly is provided in the form of an XY-actuator that drives the probe or sample in a horizontal, or XY-plane and a Z-actuator that moves the probe or sample in a vertical or Z-direction.

As the utility of SPM continues to develop, a need has arisen for imaging different types of samples at greater speeds to improve sample measurement throughput, including imaging larger sample areas. Although AFM intrinsically has a resolution determined by the probe apex, usually a few nanometers, the level of detail in the AFM image depends on the scan size. For example, a conventional 512×512 pixel image has detail of 2 nm if the scan size is 1 µm but 20 nm and 200 nm per pixel if the scan size is 10 µm and 100 µm respectively. Clearly, high resolution and large scan size come at a cost of throughput. Using the same example, if the 10 µm image size requires 2 nm detail, the pixel density needs to be 5000×5000, instead of 512×512. Because AFM uses faster scanning to acquire images, increasing data in each scan line by 10 times will require the Z feedback loop to be 10 times faster to obtain of the data for each pixel. The scan time will also be ten times longer to obtain an image because the 5000 lines of data are obtained in sequence, increasing the time to obtain a normal image from 8 min per frame to more than 1 hour per frame.

Other factors can limit imaging speed as well, including the cantilever response time, the usable scanner bandwidth in X, Y and Z directions, the slew rate and bandwidth of the high voltage amplifier that drives the scanner, the speed of cantilever force sensing, as well as the demodulation system and the tracking force feedback system.

SPM images are typically constructed of arrays of measurements recorded at different locations on the sample. For example, an image may contain the local value of the relative sample height measured over an array of different XY locations on the sample. Alternative measurements can include amplitude, phase and frequency response of the cantilever, as well as electric and magnetic forces, friction, and stiffness of the sample, etc. The measured data is representative of the sample surface.

In addition to the speed constraints noted above, high resolution imaging in a large area sample is usually achieved progressively. In particular, a survey scan in a large area is often used to determine if sample includes an interesting feature. If the feature is identified, the AFM will allow the user to zoom in on the feature multiple times until the desired resolution is attained or the limit of the tip radius is reached. The judgment of whether a feature should be further imaged (higher resolution) is provided by a trained operator and the zoom-in scan can be manually initiated with most AFM tools.

A specific application of nanometer feature detection and measurement is nano-asperity measurement of disks used in data storage. Nano-asperities are concave features ranging a few nano-meters in height and 20-40 nm in diameter on hard disk media. During a data read/write process, the distance of the magnetic pole tip of the read/write head to the disk media is also in the range of nanometers. A nano-asperity may permanently damage or "crash" the disk read/write head if its height exceeds the fly height of the read/write heads. As a result the disk media are routinely inspected to monitor the occurrence of the nano-asperities, preferably using an AFM.

One problem in this regard is that the disk area to be analyzed is relatively large when considering the size of the defects that are intended to be identified. Optical techniques are able to measure large areas in a relatively short amount of time; however, such techniques are not able to identify nano-asperities. AFM provides the ideal solution in this regard. The trade off, however, is that an AFM scan takes a relatively long time with a scan speed in a range of about 1 Hz, such that bringing attention to image at high data density locations in a 10 micron scan size becomes prohibitively time consuming.

Moreover, a related problem is that, with a 1-2 nanometer height of the nano-asperities, precision greater than 1 Angstom is required. To achieve this level of precision, the AFM must be operated at a relatively slow rate to yield usable data. A compromise used in current practice is to scan a 10 µm×10 µm area for relatively large sampling coverage at 512×512 lines per image, which takes about 8.5 minutes to complete one image, and over an hour to survey a small portion of the sample, e.g., a selected area of disk. Even when imaging at this carefully slow rate, however, the pixel size of each data point is about 20 nm, which is similar in size to the nano-asperities. Therefore, not only is it possible that the measurement easily misses small asperities, but the height data, when the pixel does correspond to a nano-asperity, barely reflects the true height and shape of the concave asperity with a single, or even a few, data points.

Using AFM also presents difficulty when attempting to correctly differentiate and identify the characteristics of nano-asperities, especially considering system noise. System noise can be caused by a large and diverse number of sources, such as the actuators, the probe cantilever 15, electrical signal noise, etc. System noise can cause false positive identification of a nano-asperity, mischaracterization of a nano-asperity, etc. Noise is incoherent. As a result, when features are larger they typically can be readily distinguished by a proficient user. However, as feature size gets smaller, this property of noise becomes less distinguishable. During slow speed, high resolution scanning, noise can be accounted for using data averaging at slow speeds, such as approximately 1 Hz. However, this technique is not applicable during higher speed scans where the number of data points associated with a point of interest is much lower and would tend to distort rather than enhance detected features, and still relies on a trained operator.

Figure 2:
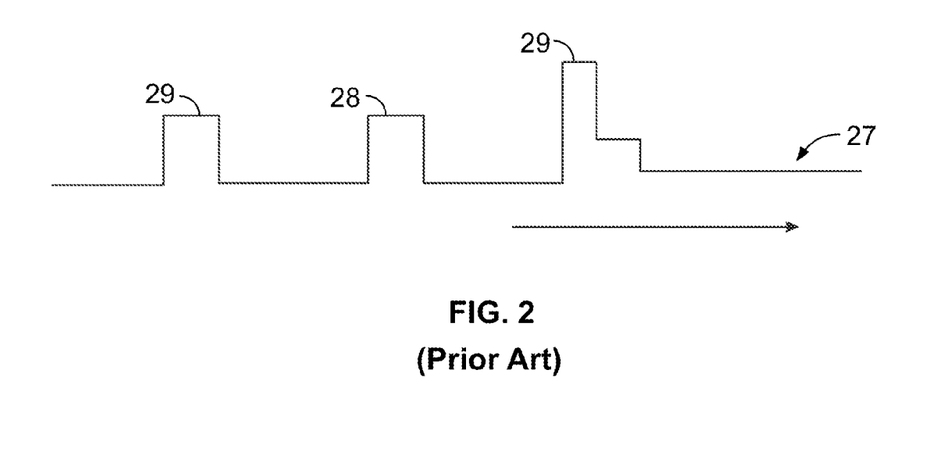
FIG. 2 is a sample AFM output graph produced using standard AFM imaging techniques, appropriately labeled "Prior Art"

Moreover, there are disadvantages to relying on human judgment, however, even when the user is a trained operator. This is especially the case when the feature is very small and the image is relatively noisy. Referring to FIG. 2, a schematic sample AFM image 27 produced using standard AFM imaging techniques is shown, according to an exemplary embodiment. Image 27 illustrates the output that is generated by the AFM 10 including an identification of a nano-asperity 28, along with a plurality of noise instances 29. As understood in the art, when attempting to identify and image sample features 28 on the scale of nano-asperities, such features of interest are indistinguishable from the noise instances 29 through normal human operator perception. As a result, using AFM to identify and image nano-asperities has not been prolific.

With the continuing trend of reducing the fly height of read/write heads, the importance of qualifying disks for smaller asperities continues to increase. The art of small-scale defect detection is therefore in need of a technique of operating an AFM at a faster rate, while still being able to provide high resolution data as well as sufficient data quality control.

SUMMARY OF THE INVENTION

High resolution data is obtained by performing an automatic zoom-in scan of nanometer scale features. The zoom-in scan is similar to an optical zoom on a digital camera where data resolution is factually improved. Though an experienced operator can usually determine a zoom-in location, due to the noise and occasional instability of the feedback loop, even an experience operator can misjudge the asperity event when analyzing data corresponding to a few pixels. In the end, even experienced AFM operators are not suitably effective to make a real time decision of the zoom in the area when attempting to identify small-scale features such as nano-asperities. One objective of the invention is to develop an algorithm to detect an asperity event in a survey scan through multi-dimensional data in real time. Once the asperity event is detected, the scanner or the stage will automatically move to the precise location to perform high resolution imaging. Another objective of the invention is to automate the entire instrument set-up, as well as the pattern (such as nano-asperity) detection, high resolution zoom-in imaging and report generation processes.

By reducing the survey scan purpose to detection rather than measurement, the survey scan can be performed in a larger area at a higher speed, which increases both throughput and data resolution.

The preferred embodiments automatically perform a sequence of measurements with the SPM, including conducting a survey scan in a large area, identifying desired feature (s), and then performing high resolution measurements according to the feature properties.

Notably, human eyes can only look at one image at a time. On the other hand an AFM tool usually produces (six) 6 channels of data simultaneously, including trace/retrace data for height, amplitude, (or deflection if the contact mode AFM is used) and phase. Correlation of these images can effectively differentiate noise from true data. Such correlation is impossible for the operator to establish during real time imaging, and unfortunately is effectively useless if performed offline since the tip may not be able to be reliably positioned at location because of drifting and hysteresis effects. An automatic tool that detects the feature presence in real time (i.e., as scanning imaging progresses) and zooms in to the feature location for high resolution data is desired. Such a tool would intelligently select the area of the zoom-in scan to avoid excessively large high resolution scans, thus providing high resolution data only when and where the pre-determined interesting features are detected.

One key advantage of the invention is automatically identifying the desired feature during large area survey scans. Feature detection uses multi-dimensional data, including the feedback response in trace/re-trace scanning, as well as phase and amplitude data. The real time analysis of the multi-dimensional data results in positive identification of the feature. The coordinates and the properties of the feature are then used to perform a high resolution measurement of the feature at an appropriate zoom-in scan size and speed, automatically. Feature detection occurs over an area achievable by a piezo scanner and through an offset of a motorized stage. The automation process also includes setting scanner control through use of an inversion-based iterative feed forward algorithm, as well as setting imaging parameters for the cantilever feedback control and automatically engaging and disengaging the AFM tip.

According to an aspect of the preferred embodiment, a probe-based instrument for identifying and providing greater resolution for one or more sample features is described. The instrument includes a scanning probe microscope (SPM), the SPM including a probe having a cantilever bearing a tip, a feature identification engine configured to identify a sub-section of the sample, the sub-section including a feature detected based on the sample surface data using at least two identification parameters, and a feature scanning controller, the feature scanning controller configured to provide control signals to the SPM to scan the sub-section of the sample at a second resolution as a probe of the SPM interacts with the sub-section of the sample, the second resolution being greater than the first resolution.

According to another aspect of the preferred embodiments, a method of operating a scanning probe microscope (SPM) including scanning a sample at a first resolution as a probe of the SPM interacts with a sample and collecting sample surface data in response to the scanning step. The method then, during collection of the sample surface data, identifies a feature of the sample from the sample surface data using at least two identification parameters and automatically performs a zoom-in scan of the feature at a second resolution based on the identifying step, the second resolution being greater than the first resolution.

In another aspect of the preferred embodiments, the identifying step includes confirming the authenticity of the feature, and the confirming step includes analyzing trace and re-trace data sets of the sample surface data using one or more verification tests.

According to a further aspect of the preferred embodiments, the confirming step includes at least one of analyzing trace and re-trace data sets of the sample surface data, confirming authenticity based on a principle component analysis of a neural network, and comparing a known pattern with the feature by pattern recognition analysis.

According to another exemplary embodiment of the preferred embodiments, a method of operating a scanning probe microscope (SPM) to identify and provide greater resolution for one or more sample features is described. The method includes performing a survey scan of a sample at a frequency of at least 5 Hz to generate sample surface data at a first resolution based on interaction between a probe of the SPM and the sample, identifying a sub-section of the sample including a feature having a height greater than about 1 nanometer, verifying the sub-section to identify the feature from noise using at least two verification tests including at least one of feedback inverse correlation testing, pattern match testing, and reverse symmetry testing, and performing a data scan of the verified sub-section of the sample at a second resolution as a probe of the SPM interacts with the sub-section of the sample, the second resolution being greater than the first resolution.

One aspect of the preferred embodiments further includes where the verifying step includes analyzing trace and re-trace data sets of the sample surface data to eliminate sub-sections where the feature does not have spatial recurrence. Another aspect includes identifying hysteresis in the trace and re-trace data sets such that spatial recurrence is defined according to a range based on the identified hysteresis. Yet another aspect includes at least one signal corresponding to feature height, probe amplitude, probe phase, probe harmonic response, probe deflection, and friction, electric response and magnetic response between a probe tip expand and the sample.

According to another aspect of the preferred embodiments, the verifying step is based on a principle component analysis of a neural network or includes comparing a known pattern with the feature using pattern recognition analysis. Another aspect of the invention includes changing one or more parameters of the SPM operation based on one or more characteristics of the detected feature prior to scanning at the second resolution.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 3:
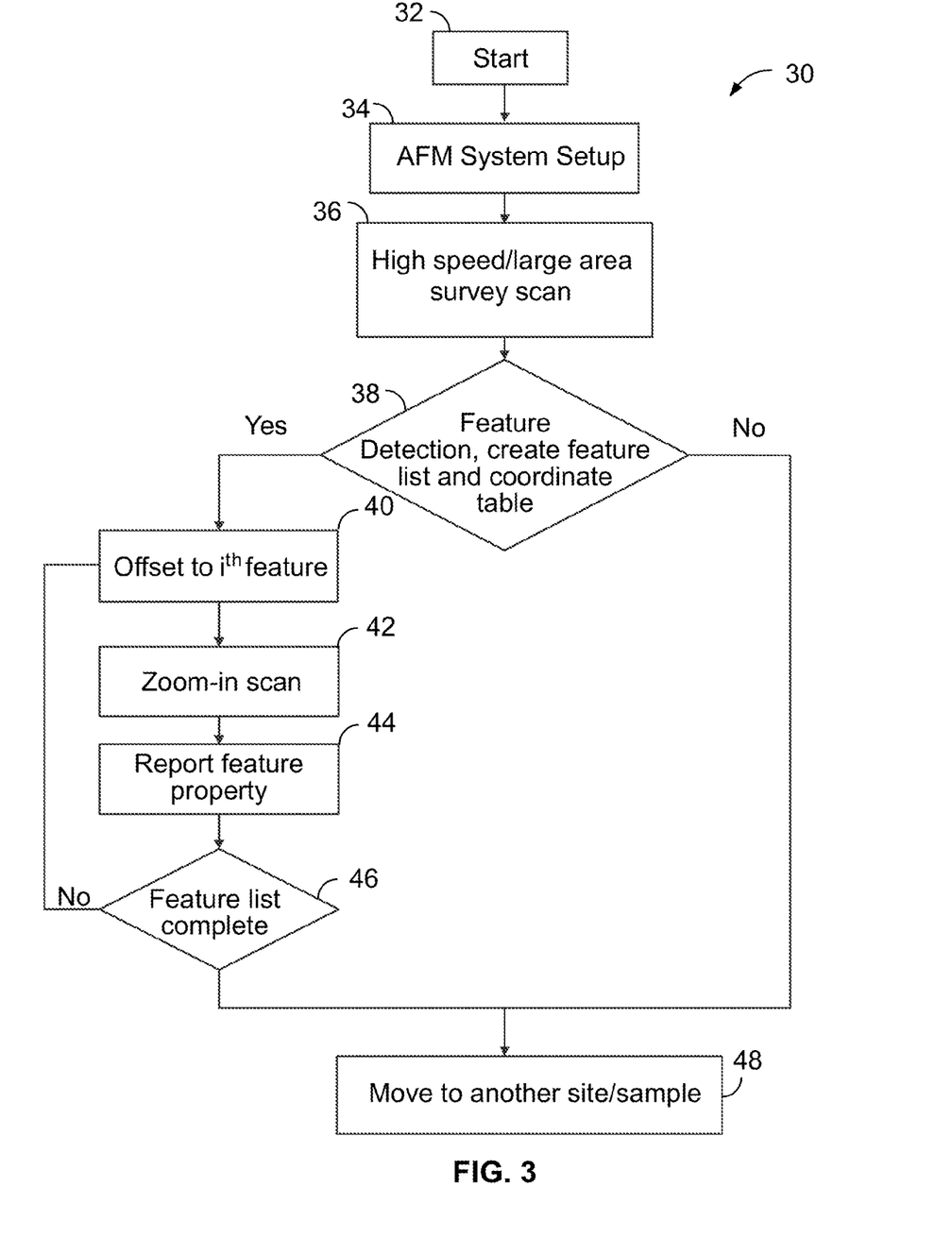
FIG. 3 is a flow chart illustrating a method of the preferred embodiments.

Referring initially to FIG. 3, the automatic imaging process 30 of the preferred embodiments contains the following steps. According to an exemplary embodiment, process 30 may be implemented using a feature identification engine implemented in software, hardware or firmware and configured to implement the methods described herein. According to the exemplary embodiment, the feature identification engine may be implemented as a software process within AFM Control/Computer 20, and will use multi-dimensional data including, for example, amplitude, phase, deflection, trace and retrace data, etc. during realtime imaging to identify the feature of interest and distinguish the identified feature of interest from other data such as noise. After a start-up and initialization step in Block 32, the state of an imaging operation includes having the system automatically set cantilever probe operating parameters in Block 34. AFM system set-up includes engaging probe with the sample so as to cause it to interact with the sample and then optimizing feedback gaining control based on analyzing the amplitude, noise and feedback response noise level to achieve a necessary feedback bandwidth. The gain control can also be achieved by a model based controller which is derived from the transfer function of the system while the probe is interacting with the sample. With the AFM properly setup, method 30 starts a high speed scan for a large area, i.e., a survey scan, in block 36. In this block, the inversion-based iterative feed forward controller described in the present assignee's (Veeco Instruments, Inc.) pending United States patent application (U.S. Ser. No. 11/800,679, titled "Closed Loop Controller and Method for Fast Scanning Probe Microscopy") is used to optimize the scanner drive to avoid mechanical instability of the scanner such as that caused by system resonance.

In Block 38, as the survey scan proceeds, each pair of the trace/re-trace data sets are analyzed for feature detection. Each pair of the trace/re-trace data sets may be associated with a sub-section of the same such as a specific coordinate, a line of coordinates, and area of the sample, etc. If features of interest are detected, these features are marked by their coordinates, $x_i$ and $y_j$, substantially in real time, and the survey scan continues. Once the survey scan is complete, the scanner is then controlled to offset to the $i^{th}$ feature of interest in Block 40, and method 30 performs a smaller size scan at higher speed and resolution for that $i^{th}$ feature (zoom-in scan) in Block 42. The corresponding feature properties are then recorded and communicated in Block 44. Method 30 then offsets the position between the probe and the sample in Block 46 to the i+1 feature and performs a data (zoom-in) scan and continues until all the features in the survey area are scanned.

When all the features are scanned to produce zoom-in high quality data (or if no feature of interest, e.g., nano-asperities), the probe is withdrawn from the site and moved to the next site by the AFM stage in Block 48 and the method 30 is repeated. If the next site sample is within the reach of the scanner XY range, the probe does not need to be withdrawn. A new site scan can be performed by simply offsetting to the new site coordinate with the XY scanner through the programmed positions or by other types of control, for example, under user control.

Figure 4:
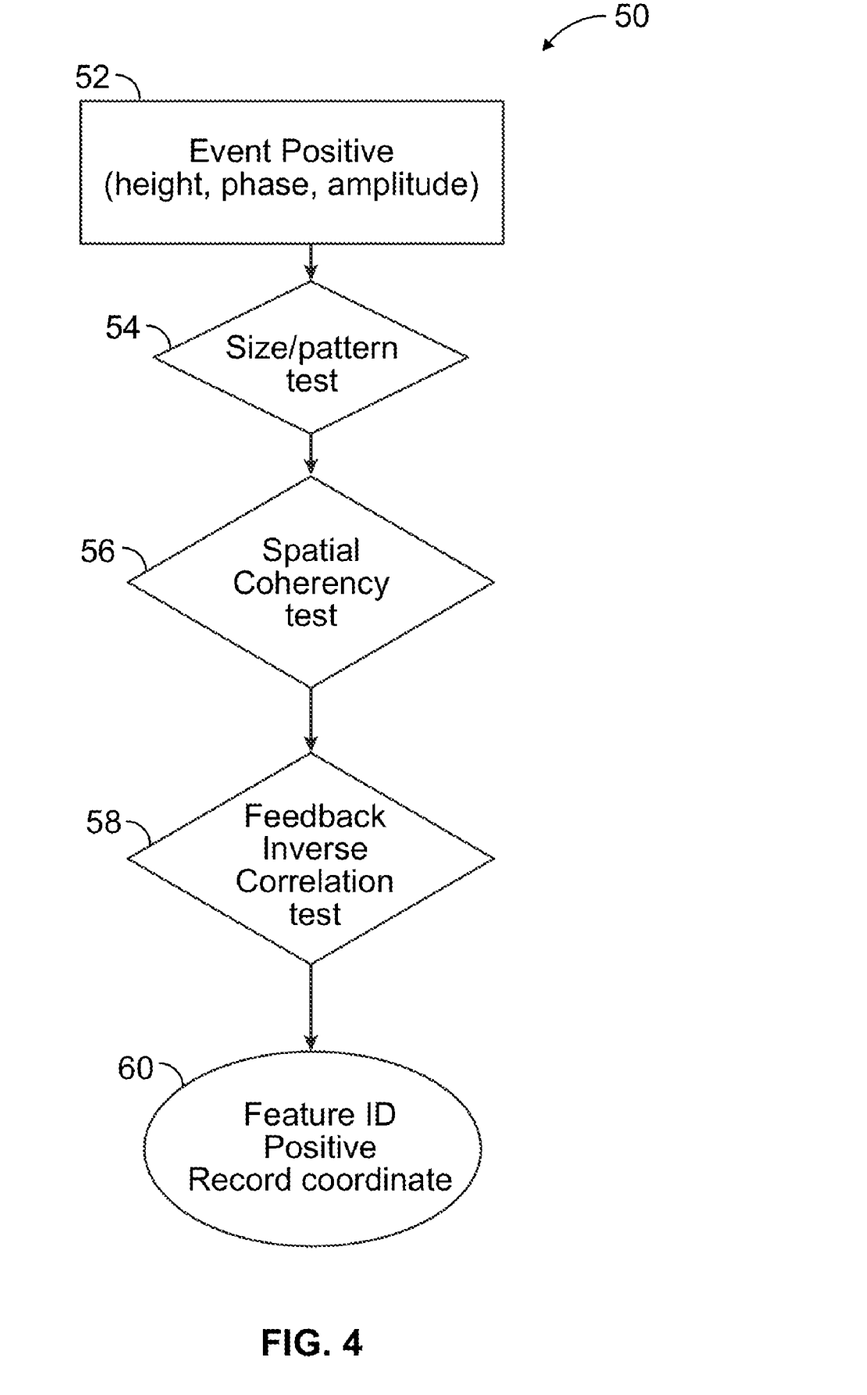
FIG. 4 is a flow chart illustrating a method of feature detection according to the method of FIG. 2.

Feature detection proceeds accordingly to the following steps of a method 50 shown in FIG. 4. In Block 52, method 50 determines whether a positive event was detected at a particular location by analyzing pattern feature height, phase and/or amplitude for nano-asperity detection. Such event detection can be directed to any change in the data above, for example, a 1 nm threshold, thereby indicating existence of a feature having a height taller than 1 nm. Data is sorted for every pixel in sequence with the real-time imaging of the AFM operation.

Blocks 54-58 of method 50 are directed to further verification of feature characteristics in order to avoid false ID of event positive features. Although blocks 54-58 describe multiple feature identification parameters, one of ordinary skill in the art would understand that feature identification may include using one or more of these parameters. According to a preferred embodiment, at least two identification parameters may be used for feature identification. Feature identification may include performing one or more verification tests wherein the existence and/or characteristics of a feature are determined following an initial identification of the feature on the sample within a scan line.

In Block 54, size criteria are checked. Prior knowledge of the feature lateral and vertical dimension is used to select features that passed event detection with the expected lateral size. Note that the high speed scan may cause the collected data to have an extended size in the scan direction due to the delay of the feedback response and the cantilever dynamics. This factor can be taken into account according to the feedback characteristics. The knowledge of the feature dimension can also be a pre-determined pattern, or principle components analyzed by a neural network. In Block 56, spatial correlation is analyzed. Unlike the noise, the physical features should always occur at the same geometrical location, and have a similar shape. As a result, the trace and retrace scan line should encounter the same feature at substantially the same geometrical location. Noise and perturbation, on the other hand, occurs in a random time sequence, i.e., phenomena rarely correlate at the same geometrical location for the trace and retrace lines.

Next, in Block 58, feedback inverse correlation is performed. This characteristic takes into account feedback response symmetry when it encounters a topographical barrier. Feedback generally responds sharply when it hits the barrier, but exhibits a parachuting effect (for an explanation of this phenomena, see pending application U.S. Ser. No. 11/800,679, titled "Closed Loop Controller and Method for Fast Scanning Probe") as it passes over the barrier. This characteristic is symmetric about the feature location for the trace and retrace scan lines. The local data subset of the trace and retrace line is horizontally flipped and scaled to the same amplitude. The correlation scaling factors are judged as a further signature of the feature. When an event passes all these tests it usually establishes itself as a positive feature ID. Its coordinate is used for a zoom-in scan for this providing a means to discriminate, for example, noise from true features.

Figure 5A:
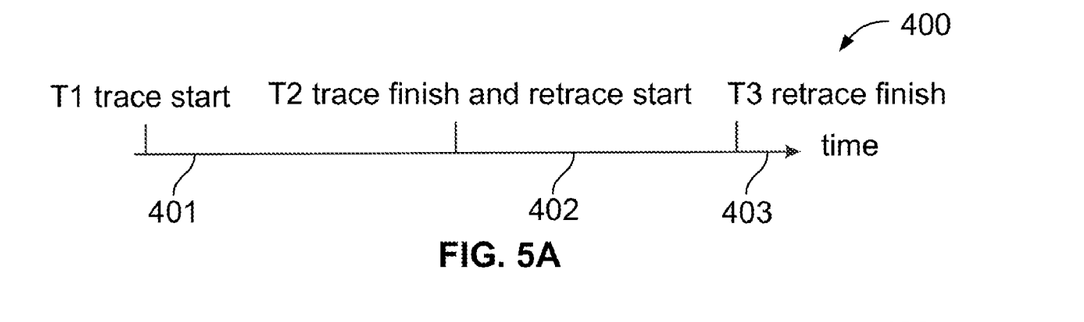
FIGS. 5A-5D are a series of exemplary schematic graphs showing trace/re-trace data analysis illustrating a spatial correlation test.

Turning to FIGS. 5A-5D, the spatial correlation operation is illustrated. Referring first to FIG. 5A, a trace timing diagram 400 for a single imaging line is shown. Diagram 400 illustrates that, for a single imaging line, multiple traces of the same surface will occur to obtain multiple sets of data. A first trace 401 gathers the initial data in a first pass over the sample. A second trace 402 passes over the same area in a reverse trace direction. First trace 401 and retrace 402 may have differences based on the direction of the trace, noise during one or the other of tracings, etc. Following completion of trace 402, a second trace 403 may be performed to provide an additional set of data.

Figure 5B:
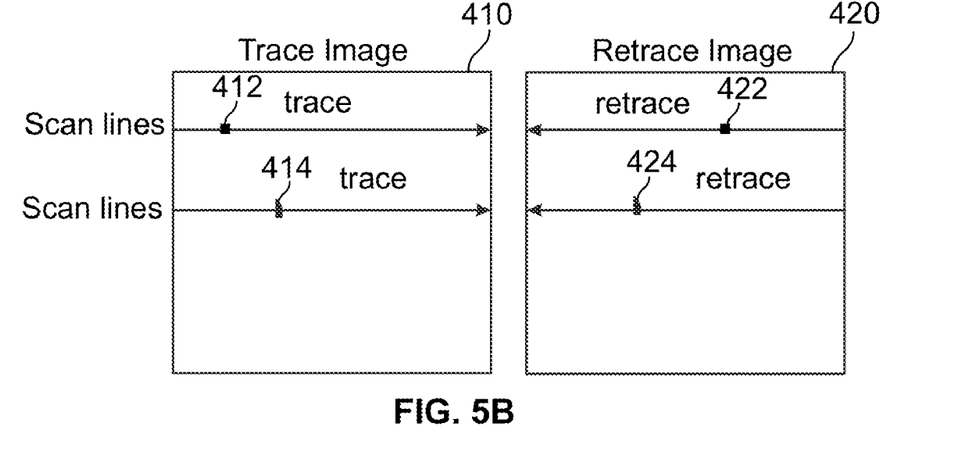
Figure 5C:
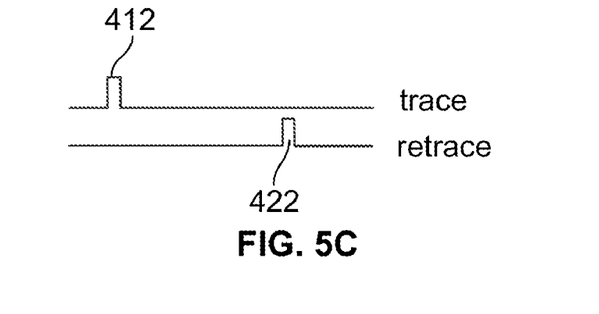
Figure 5D:
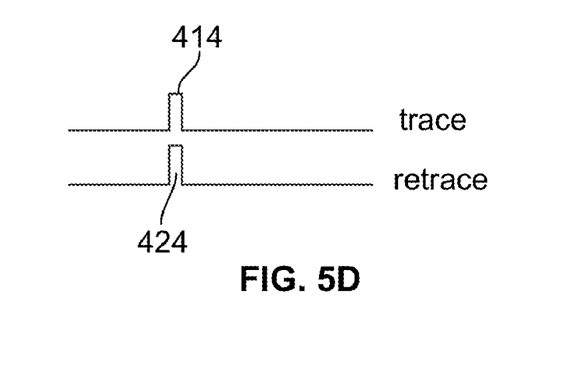

Referring now to FIG. 5B, a first solid square 410 illustrates trace data generated by traces 401 and 403, the trace data including data events 412, 422, 414 and 424 that occurred during imaging. All the events 412-424 satisfy the event detection criteria. However, referring now to FIG. 5C, when the trace and retrace data are plotted in the same space, 412 and 422 failed to show at substantially the same location. As a result, 412 and 422 are disqualified as potential features of interest, e.g., nano-asperities. The other two events, referring now to FIG. 5D, 414 and 424, occur at the same geometrical location in the pair of the trace-retrace line, therefore, passed the feature ID test. At this point, typically, further tests are performed.

Figure 6:
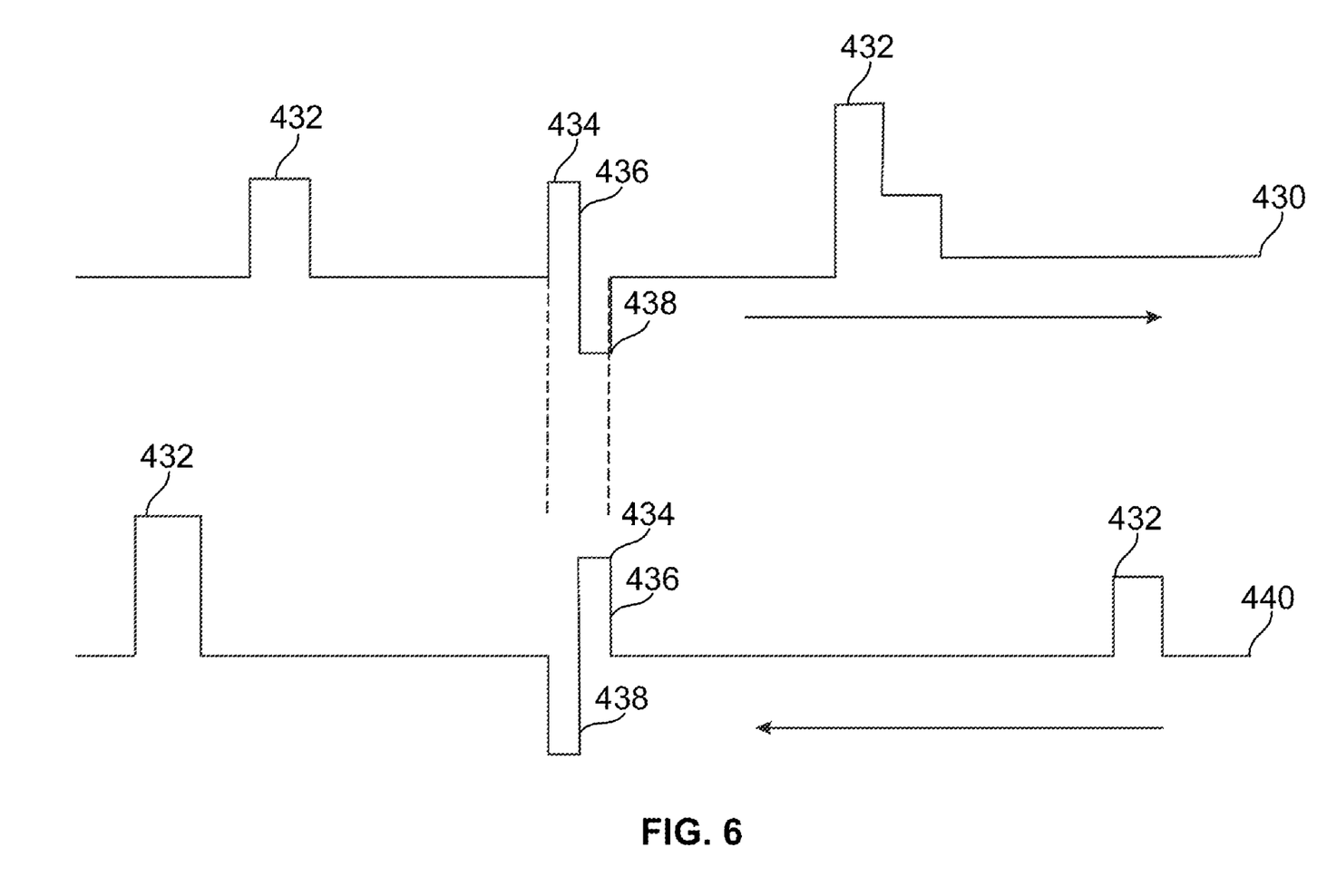
FIG. 6 is graphs illustrating spatial correlation that occurs in a trace/retrace operation.

Referring to FIG. 6, graphs illustrating spatial correlation that occurs in a trace/retrace operation are shown. The graphs 430 and 440 represent a data set plotted as a function of the position of the probe when the probe scans a line of the sample in a forward and backward direction, i.e., a trace-retrace operation. The trace graph 430 and retrace graph 440 shown AFM scans of substantially the same linear spatial location. As seen in graphs 430 and 440, noise instances 432 occur randomly in time sequence and therefore can occur anywhere in graphs 430 and 440. Conversely, the feature 434 occurs consistently at the same location with the same height. Such correlation is therefore defined as the spatial correlation of data. Although feature 434 generally occurs consistently at the same spatial location, variations in the position of the feature can be shifted slightly due to the hysteresis in trace and retrace scans and yet remain at the substantially same position.

Trace graph 430 further illustrates the data set generated when a feature 434 is encountered. The feature 434 causes initial spike 436 when the feature is encountered followed by a depression 438 after the probe has passed the feature 434 due to a parachuting affect by the probe once the falling edge is encountered and the control system attempts to cause the probe tip to re-engage the sample as quickly as possible. Retrace graph 440 illustrates that the pike 436 and depression 438 are in reverse order during the retrace operation, with the falling edge of the feature upon the trace operation becoming the climbing edge.

Figure 7A:
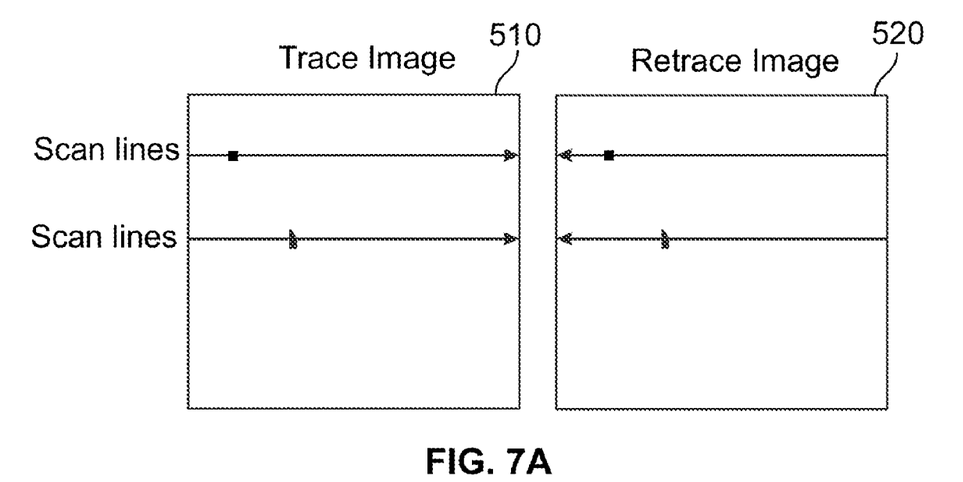
FIGS. 7A-7D are a series of graphs showing trace/re-trace data analysis, illustrating a reverse symmetry test.
Figure 7B:
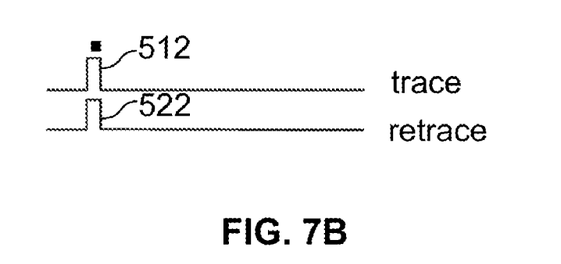
Figure 7C:
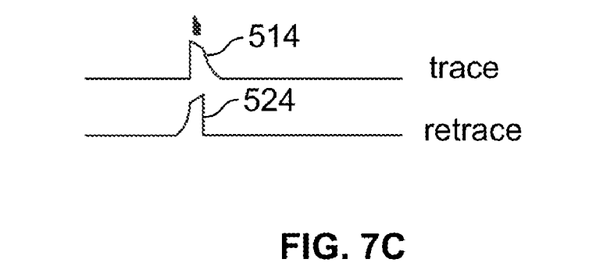
Figure 7D:
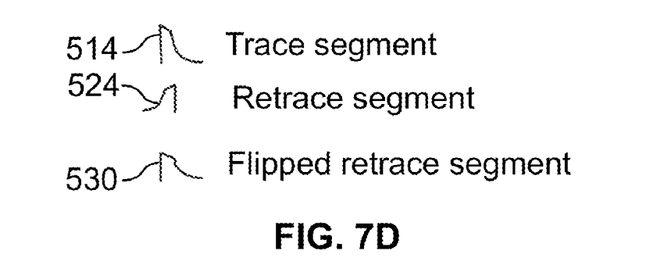

Next in FIGS. 7A-7D, graphs and figures illustrating reverse symmetry that occurs during a trace/retrace operation is analyzed. Referring first to FIG. 7A, a first solid square 510 illustrates trace data generated by traces, the trace data including data events 512, 522, 514 and 524 that occurred during imaging. All the events 512-524 satisfy the event detection criteria. Further, as can be seen, events 512 and 514 also satisfy the spatial correlation test described above with reference to FIG. 5. Reverse symmetry is a reflection of the feedback characteristics at high speed and a large size scan when the feedback loop is not fully responsive to the feature, again sometimes referred to as "parachuting." Referring to FIG. 7B, an event that does not cause parachuting is shown. However, referring now to FIG. 7C, events 514 and 524 exhibit parachuting effects. As the probe tip encounters the feature in event 514, the sharp amplitude reduction causes the feedback to respond quickly, indicated as a sharp rise of z in the trace line of the feature 514. As the tip leaves the feature 514, the amplitude grows slowly, defined by the cantilever dynamics, causing a slow response of the feedback loop. In the retrace line 524, the tip hits the feature from the right hand side. The parachuting is therefore on the left hand side. Referring now to FIG. 7D, using the present analysis tool, the local data may be removed and one of the trace/retrace sets of data is flipped about its maximum. The flipped retrace segment 530 is then scaled to have the same height as the trace segment, the correlation factor and scaling factor of the two segments are calculated. The results are used as a further filter for the feature ID, wherein the greater the correspondence of the modified and unmodified data, the greater indication of a positive ID. A correlation factor of "1", for instance, would typically provide a strong indication of a positive feature ID. On the other hand, in the presence of noise, qualification may be met with a 0.7 or 0.8 correlation factor, for instance.

Figure 8:
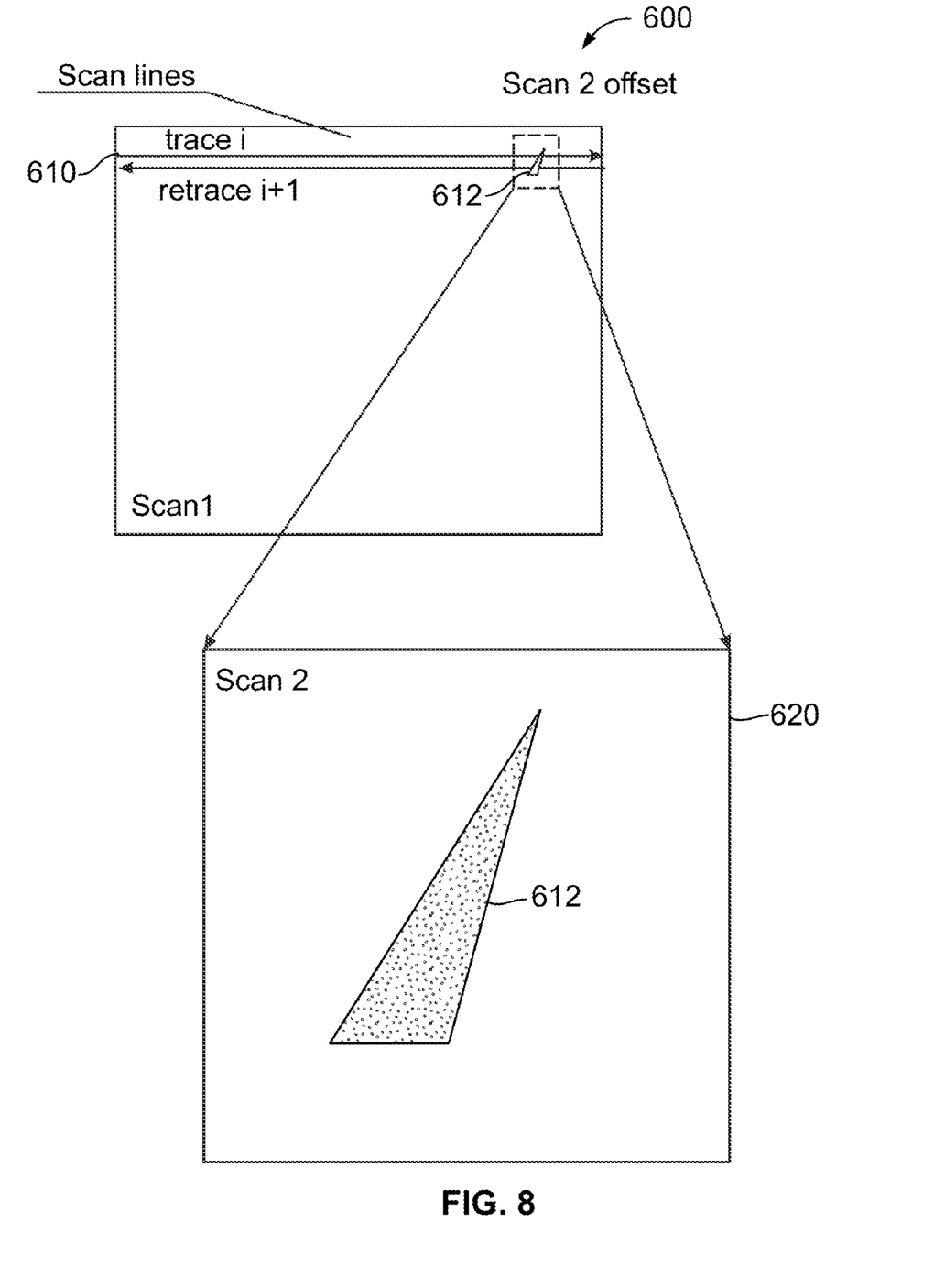
FIG. 8 is a schematic illustration of survey and data scan images, obtained according to the preferred embodiments.

Referring next to FIG. 8, a graph 600 illustrating a trace/retrace scan 610 represents a survey scan image having a large size and obtained with an AFM operating at a high scan rate. Each data line is analyzed in real time as imaging progresses. A feature 612 exhibits a unique property in the multi-dimensional data set (e.g., height, amplitude, phase, and pattern shape) and data correlation are considered in the trace-retrace lines 610. Such correlation is used to mark the identification of the feature. The offset is then used to re-center the imaging process at a smaller scan size, providing an enhanced data set 620 having higher data density and quality.

Figure 9:
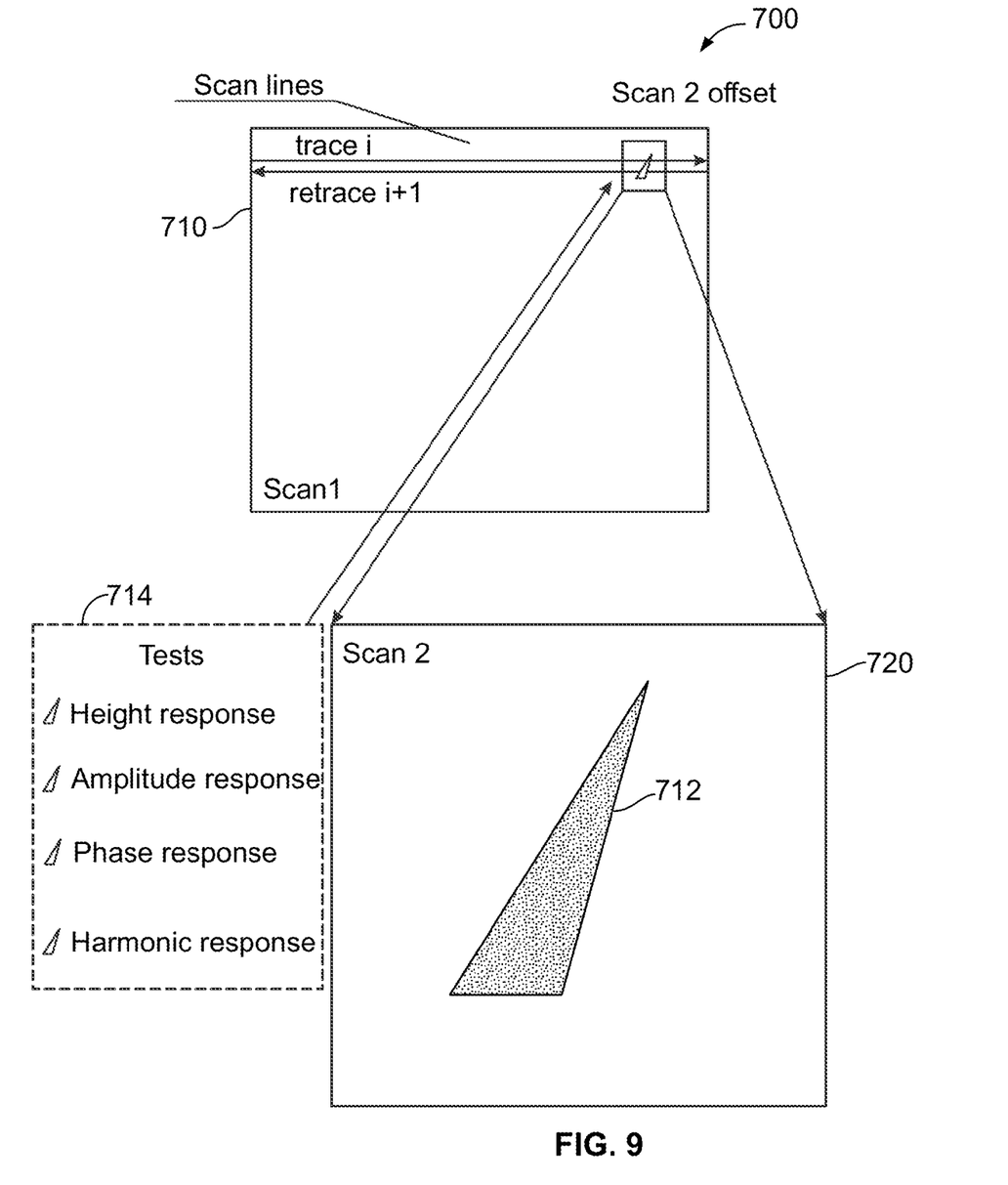
FIG. 9 is a schematic illustration of survey and data scan images similar to FIG. 8, showing multi-dimensional data correlation.

Referring now to FIG. 9, a graph 700 illustrating a large size survey scan (scan 710), the high speed scan lines usually have insufficient data points, buried with high noise. In one of the preferred embodiments, the size, spatial, and reverse symmetry tests, as shown in block 714, are performed for multi-dimensional data such as height, amplitude, phase and harmonics so that the feature ID has a high detection rate and lowest possible false ID rate in the presence of the noise and perturbations. After scan 710 is performed and a feature 712 positively identified during scanning, a zoom-in scan 720 is performed subsequently to achieve high resolution data.

Figure 10:
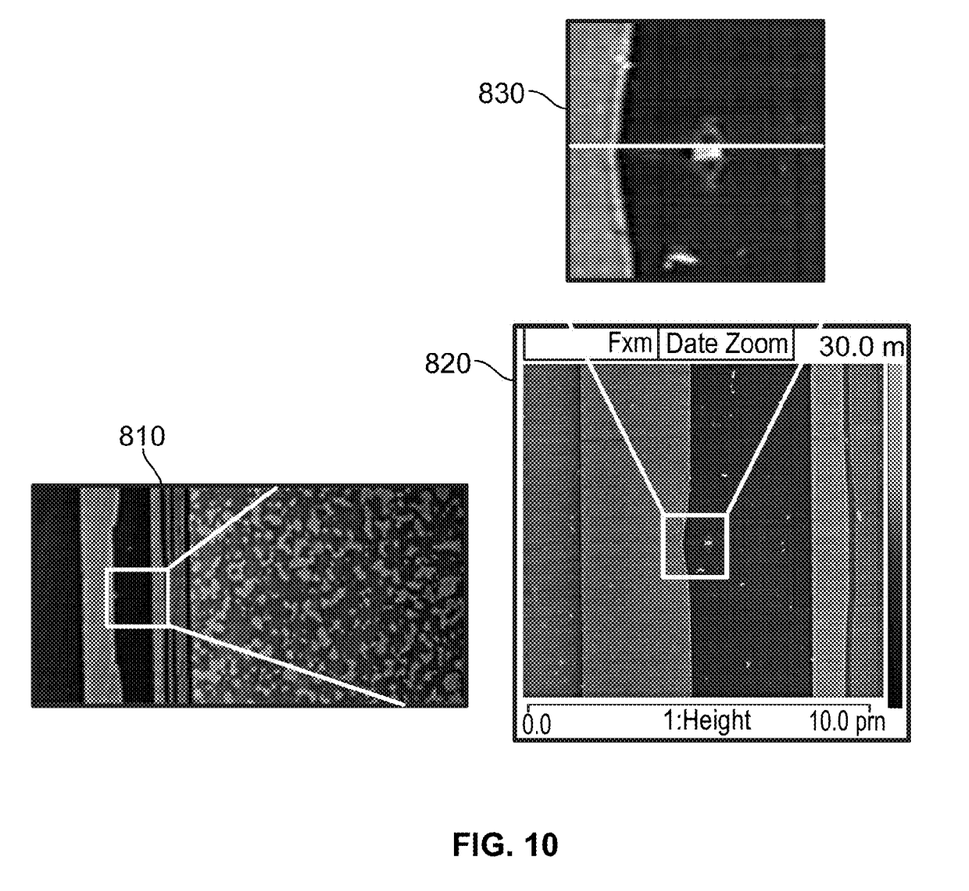
FIG. 10 shows a series of AFM images illustrating a zoom-in scan.

Referring now to FIG. 10, the sequence of a zoom-in scan is performed by a pattern recognition process. First a large scan 810 with a known pattern area 820 is analyzed using any of the data types noted previously, including height, amplitude, phase, and harmonics response. Once the pattern 820 is identified within large scan 810, a zoom-in scan is automatically performed. Pattern 830 occurs within pattern 820. This pattern with the highest resolution of the feature of interest is further zoomed in the scan 830 for any or all of the mentioned data types.

Figure 11:
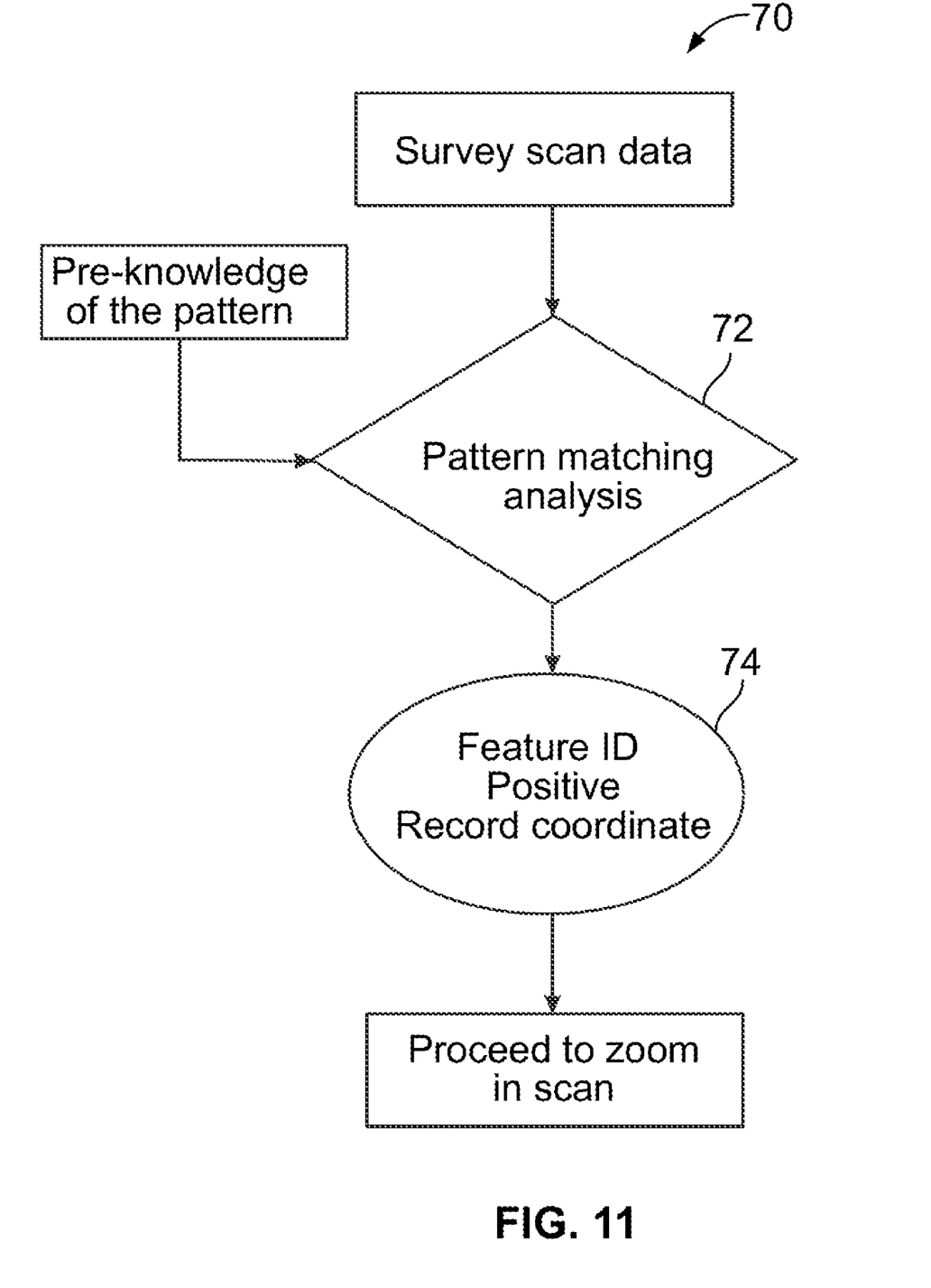
FIG. 11 is a flow chart illustrating an alternate embodiment of the invention.

In an alternative embodiment, a pre-known pattern (location/parameter/etc.) associated with the particular sample under test is compared with the full set or subset of the survey scan data. As illustrated in FIG. 11, a method 70 includes performing a pattern matching analysis (Block 72) and when a match occurs, the feature ID is recorded (Block 74) and the AFM proceeds to a zoom-in scan at the detected region to obtain high resolution data. The pattern match process then includes simple pattern correlation, principle component analysis, and/or other pattern recognition tools.

In one example, one preferred embodiment may perform with the following specifications:

| | |
|---|---|
| Throughput: | ~30 minutes for 8 regions of 20um × 10um plus 1 additional minute per Nano-Asperity. |
| NA Minimum Lateral | 15 nm on 2048 × 1024 survey scan |

-continued

| | |
|---|---|
| Detection (nm/pixel) | |
| Detected NA Lateral Resolution (nm/pixel) | 2 nm on 512 × 512 detail scan |
| NA Height Detection: | 1.2 nm to 10 nm** |
| NA Height Repeatability: | 20%, 1 Sigma** |
| Exemplary Height Noise | <0.6 Angstroms |
| Scan Area Size: | 20 um × 10 um regions |
| Predefined Area Scans: | Up to 8 per current customer requirements. |
| Scan Speeds: | ≧7 Hz for the survey scan; ≧10 Hz for the detail scan |
| Scan Resolution: | Survey Scan: 2048 pixels per X line; 1024 lines Y direction - Detail Scan: 512 pixels per X line; 512 lines Y direction |
| Average Tip Lifetime | ~120 scans (20um × 10um); Actual lifetime depends upon environment including substrate contamination levels.** |

**These are provisional specifications based on a small sample set used by the assignee.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

The invention claimed is:

1. A method of operating a scanning probe microscope (SPM) to identify and provide greater resolution for one or more sample features, the method including:
   scanning a sample at a first resolution as a probe of the SPM interacts with the sample;
   collecting sample surface data in response to the scanning step;
   during collection of the sample surface data,
      identifying a sub-section of the sample including a feature detected based on the sample surface data using at least two identification parameters; and
      automatically scanning the sub-section of the sample at a second resolution as a probe of the SPM interacts with the sub-section of the sample, the second resolution being greater than the first resolution.

2. The method of claim 1, wherein the identifying step includes confirming an authenticity of the feature.

3. The method of claim 2, wherein the confirming step includes analyzing trace and re-trace data sets of the sample surface data.

4. The method of claim 3, wherein the data sets include at least one signal corresponding to feature height, probe amplitude, probe phase, probe harmonic response, probe deflection, and friction, electric response and magnetic response between a probe tip expand and the sample.

5. The method of claim 2, wherein the confirming step is based on a principle component analysis of a neural network.

6. The method of claim 2, wherein the confirming step includes comparing a known pattern with the feature using pattern recognition analysis.

7. The method of claim 1, further including changing one or more parameters of the SPM operation based on one or more characteristics of the detected feature prior to scanning at the second resolution.

8. The method of claim 1, wherein identifying a sub-section of the sample includes identifying a sub-section of the samples including a nano-asperity.

9. The method of claim 1, wherein the second resolution is determined based on one or more characteristics of the detected feature.

10. The method of claim 1, wherein identifying a sub-section of the sample includes performing a retrace operation to eliminate detected features based on noise.

11. A probe-based instrument for identifying and providing greater resolution for one or more sample features, the instrument comprising:
   a scanning probe microscope (SPM), the SPM including a probe having a cantilever bearing a tip;
   a feature identification engine configured to identify a sub-section of the sample, the sub-section including a feature detected based on the sample surface data using at least two identification parameters; and
   a feature scanning controller, the feature scanning controller configured to provide control signals to the SPM to scan the sub-section of the sample at a second resolution as a probe of the SPM interacts with the sub-section of the sample, the second resolution being greater than the first resolution.

12. The instrument of claim 11, wherein identifying a sub-section of the sample includes confirming an authenticity of the feature.

13. The instrument of claim 12, wherein confirming an authenticity of the feature includes analyzing trace and re-trace data sets of the sample surface data.

14. The instrument of claim 13, wherein the data sets include at least one signal corresponding to feature height, probe amplitude, probe phase, probe harmonic response, probe deflection, and friction, electric response and magnetic response between a probe tip expand and the sample.

15. The instrument of claim 12, wherein confirming an authenticity of the feature is based on a principle component analysis of a neural network.

16. The instrument of claim 12, wherein confirming an authenticity of the feature includes comparing a known pattern with the feature using pattern recognition analysis.

17. The instrument of claim 11, wherein the feature scanning controller is configured to change one or more parameters of the SPM operation based on one or more characteristics of the detected feature prior to scanning at the second resolution.

18. A method of operating a scanning probe microscope (SPM) to identify and provide greater resolution for one or more sample features, the method including:
   scanning a sample to generate sample surface data at a first resolution based on interaction between a cantilevered probe of the SPM and the sample;
   identifying a sub-section of the sample including a feature detected based on the sample surface data;

verifying the sub-section based on at least two verification tests including at least one of feedback inverse correlation testing, pattern match testing, and reverse symmetry testing; and scanning the verified sub-section of the sample at a second resolution as a probe of the SPM interacts with the sub-section of the sample, the second resolution being greater than the first resolution.

19. The method of claim 18, wherein the identifying step includes confirming an authenticity of the feature.

20. The method of claim 19, wherein the confirming step includes analyzing trace and re-trace data sets of the sample surface data.

21. The method of claim 20, wherein the data sets include at least one signal corresponding to feature height, probe amplitude, probe phase, probe harmonic response, probe deflection, and friction, electric response and magnetic response between a probe tip expand and the sample.

22. The method of claim 19, wherein the confirming step is based on a principle component analysis of a neural network.

23. The method of claim 19, wherein the confirming step includes comparing a known pattern with the feature using pattern recognition analysis.

24. The method of claim 18, further including changing one or more parameters of the SPM operation based on one or more characteristics of the detected feature prior to scanning at the second resolution.

25. A method of operating a scanning probe microscope (SPM) to identify and provide greater resolution for one or more sample features, the method including:

performing a survey scan of a sample at a frequency of at least 5 Hz to generate sample surface data at a first resolution based on interaction between a probe of the SPM and the sample;

identifying a sub-section of the sample including a feature having a height greater than about 1 nanometer;

verifying the sub-section to identify the feature from noise using at least two verification tests including at least one of feedback inverse correlation testing, pattern match testing, and reverse symmetry testing; and performing a data scan of the verified sub-section of the sample at a second resolution as a probe of the SPM interacts with the sub-section of the sample, the second resolution being greater than the first resolution.

26. The method of claim 25, wherein the verifying step includes analyzing trace and re-trace data sets of the sample surface data to eliminate sub-sections where the feature does not have spatial recurrence.

27. The method of claim 26, further including identifying hysteresis in the trace and re-trace data sets such that spatial recurrence is defined according to a range based on the identified hysteresis.

28. The method of claim 26, wherein the data sets include at least one signal corresponding to feature height, probe amplitude, probe phase, probe harmonic response, probe deflection, and friction, electric response and magnetic response between a probe tip expand and the sample.

29. The method of claim 25, wherein the verifying step is based on a principle component analysis of a neural network.

30. The method of claim 25, wherein the verifying step includes comparing a known pattern with the feature using pattern recognition analysis.

31. The method of claim 25, further including changing one or more parameters of the SPM operation based on one or more characteristics of the detected feature prior to scanning at the second resolution.

* * * * *